United States Patent

Corwin

[15] 3,639,082

[45] Feb. 1, 1972

[54] LIQUID METERING DEVICE HAVING AN AUTOMATICALLY VARIABLE DISCHARGE

[72] Inventor: Howard Russell Corwin, North Caldwell, N.J.

[73] Assignee: Curtiss-Wright Corporation

[22] Filed: Mar. 2, 1970

[21] Appl. No.: 15,393

[52] U.S. Cl. .......................................... 417/214, 417/349
[51] Int. Cl. ........................................................ F04b 49/00
[58] Field of Search ................. 417/212, 214, 349, 294; 123/140.1

[56] References Cited

UNITED STATES PATENTS

| 2,827,852 | 3/1958 | Links | 417/349 |
| 2,752,145 | 6/1956 | Hill et al. | 123/140.1 |
| 2,910,976 | 11/1959 | Fancher | 417/294 |
| 2,538,982 | 1/1951 | Roosa | 417/214 |

FOREIGN PATENTS OR APPLICATIONS

| 729,483 | 5/1955 | Great Britain | 417/349 |

*Primary Examiner*—William L. Freeh
*Attorney*—Arthur Frederick and Victor D. Behn

[57] ABSTRACT

In a liquid metering device of the type having piston-cylinder assembly connected for receiving pressurized liquid and discharging slugs of the liquid alternately from opposite ends of the cylinder of the piston-cylinder assembly upon reciprocative movement of the piston therein, the improvement comprising a regulating means for automatically controlling the length of travel or stroke of the piston in response to the change in angular velocity of a rotating mechanism. The regulating means includes a valve actuatable by an inertia means which senses the r.p.m. of the rotating mechanism.

4 Claims, 8 Drawing Figures

INVENTOR
HOWARD RUSSELL CORWIN
BY
Arthur Frederick
ATTORNEY

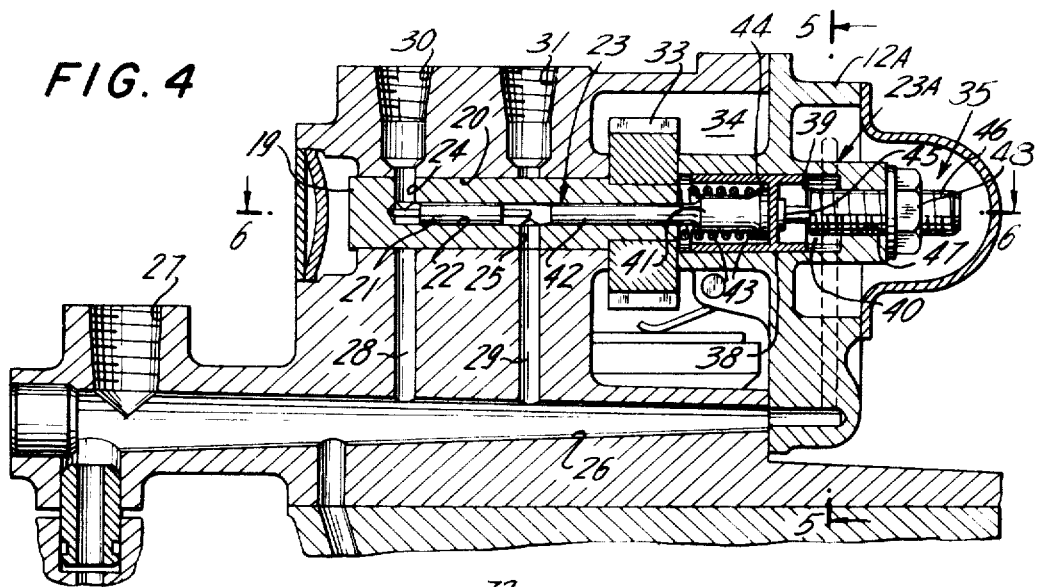
FIG. 4
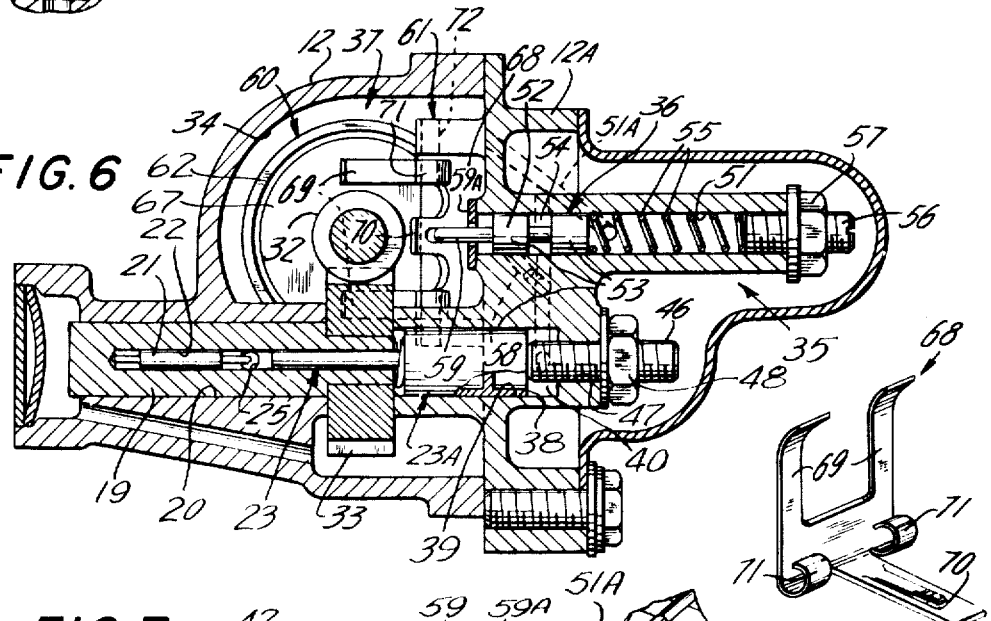
FIG. 6
FIG. 8
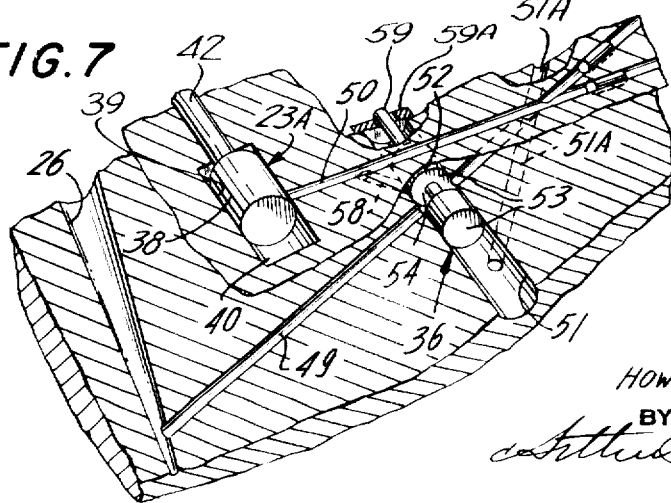
FIG. 7
INVENTOR
HOWARD RUSSEL CORWIN
BY
Arthur Frederick
ATTORNEY

LIQUID METERING DEVICE HAVING AN AUTOMATICALLY VARIABLE DISCHARGE

The invention relates to liquid metering devices and, more particularly, to liquid metering devices which are capable of varying the amount of liquid discharge in accordance with r.p.m. of another device.

BACKGROUND OF THE INVENTION

In liquid metering devices, such as the lubricant metering mechanism disclosed in the U.S. Pat. to Kemp, No. 3,172,578, the amount of lubricant metered cannot be automatically varied. While such metering devices can be mechanically modified to achieve a different rate of discharge, the variable output is not automatically adjustable in relation to the r.p.m. of the apparatus to be lubricated. A liquid metering device which is capable of providing lubricant emissions in varying amounts is especially desirable in rotary piston, combustion engines where the apex seals of the engine rotor require specifically directed lubrication. The problem in such applications is that more lubricant is required at the apex seals at high r.p.m. of the engine rotor than at low r.p.m. Thus, to insure adequate lubrication at high engine r.p.m. the metering device is constructed and arranged to deliver the quantity of lubricant required for proper lubrication at high engine r.p.m. and, therefore, produces excessive lubrication of the apex seals at low engine r.p.m. Obviously, this results in excessive consumption of oil and, in the engine exhaust, a higher level of undesirable hydrocarbon emissions.

Accordingly, it is an object of the present invention to provide a liquid metering device in which the liquid discharge rate automatically varies in proportion to the r.p.m. of a rotating mechanism.

It is another object of this invention to provide a liquid metering device which is combined with a pump into a single, compact, unitary structure.

A feature of this invention is the control piston means for changing the length of the stroke of the shuttle piston to thereby change the quantity of liquid discharged by each reciprocative movement of the shuttle piston.

Another feature of the present invention is the inertia means which automatically senses r.p.m. and coacts with a dump valve to actuate the latter and thereby control the position of a control piston means.

SUMMARY OF THE INVENTION

It is, therefore, contemplated by the present invention to provide a novel liquid metering device which comprises a housing in which a metering cylinder is supported rotation about its longitudinal axis. A free floating, double-acting piston is disposed for reciprocation in the metering cylinder. The housing is provided with a liquid inlet means communicating with a source of pressurized liquid to receive such liquid and a liquid outlet means communicating with a place of use of the liquid to pass the liquid to the latter. The cylinder has port means disposed to communicate alternately the opposite ends of the piston with the inlet means and the outlet means to thereby effect reciprocation of the piston and the intermittent discharge of liquid through the outlet means. A regulating means is provided to control the length of travel of the piston in response to the change in r.p.m. of a rotating mechanism. The regulating means includes a plunger-cylinder means which is slidably disposed in said housing for movement relative to the cylinder and the piston. A control passage means is provided in the housing to communicate the inlet means with the plunger-cylinder means to convey pressurized liquid to the latter from the inlet means and thereby urge the plunger-cylinder toward said piston to minimize the length of the stroke of the piston. The resulting means also includes a dumping passageway, the flow through which is controlled by a dumping valve. The dumping passageway is disposed in the housing to communicate the control passage means with a chamber of lower liquid pressure than the pressure of the liquid at the inlet means. Also comprising part of the regulating means is a valve actuating means constructed and arranged to sense the r.p.m. of a rotating member and coacting with said dumping valve to cause the latter, at a predetermined r.p.m., to be actuated to communicate the dumping passageway with the control passage means and cause the plunger-cylinder means to move to increase the length of the stroke of the piston so that increased liquid is delivered to the outlet means.

In another aspect of this invention, the housing of the liquid metering device also encloses a liquid pump. In this embodiment, the regulating means includes a centrifugal mass means connected to be rotated by the impeller shaft of the pump to thereby sense the r.p.m. of the shaft. Additionally, in this embodiment, the cylinder may be rotatively connected to the impeller shaft to be rotated by the latter.

DESCRIPTION OF THE DRAWINGS

The invention will be more fully understood from the following description thereof when considered in connection with the accompanying drawings, in which:

FIG. 4 is a view in cross section taken along line 4—4 of FIG. 1, showing control piston of the metering device;

FIG. 6 is a view in cross section taken substantially along line 6—6 of FIG. 5;

FIG. 7 is a cross-sectional schematic view, in perspective showing the liquid passageways interconnecting the control piston and dump valve according to this invention; and FIG. 8 is a perspective view of the bellcrank lever of the valve actuating means according to this invention.

DESCRIPTION OF THE PREFERRED EMBODIMENTS

Figure 1:
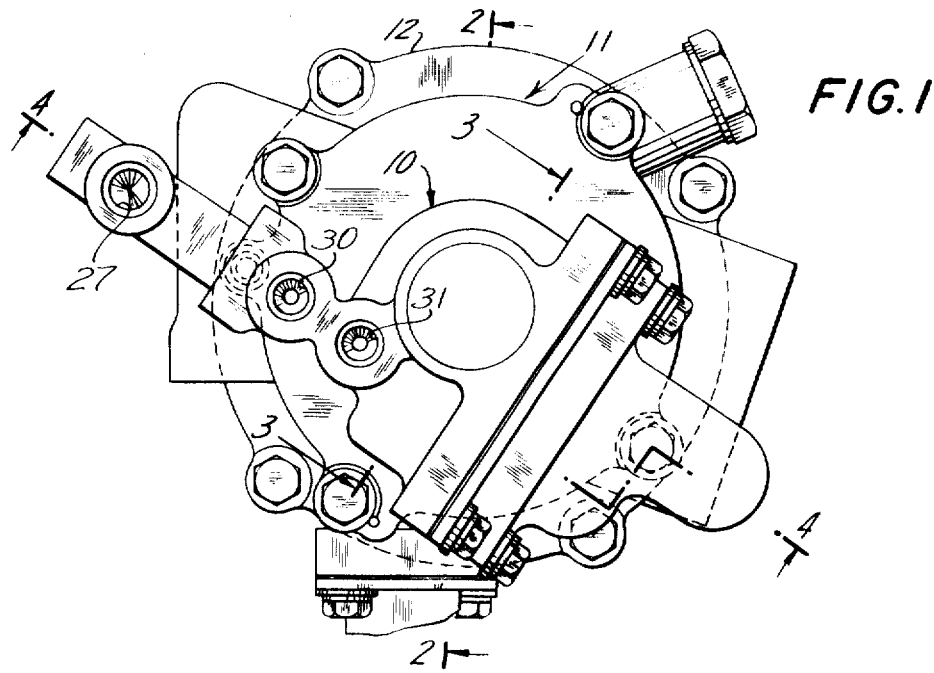
FIG. 1 is an end view in elevation of the liquid metering device and pump assembly according to this invention.
Figure 2:
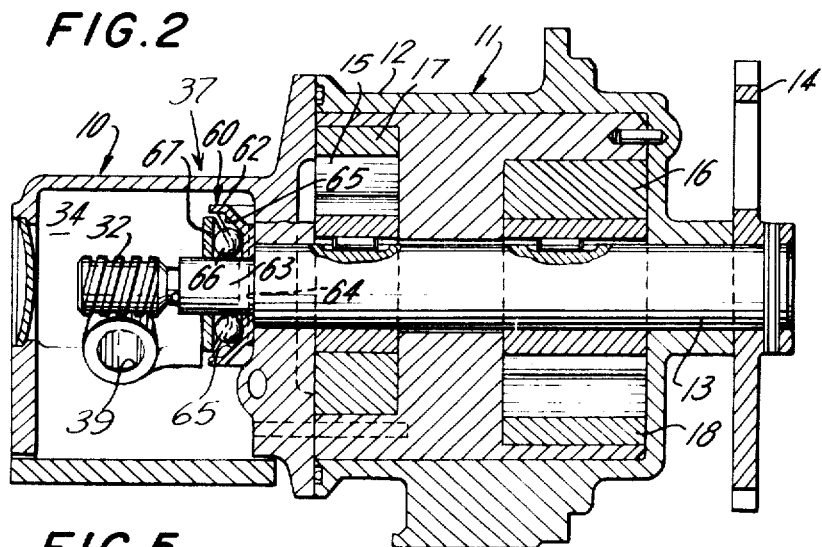
FIG. 2 is a longitudinal cross-sectional view taken substantially along line 2—2 of FIG. 1 showing the pump assembly.
Figure 3:
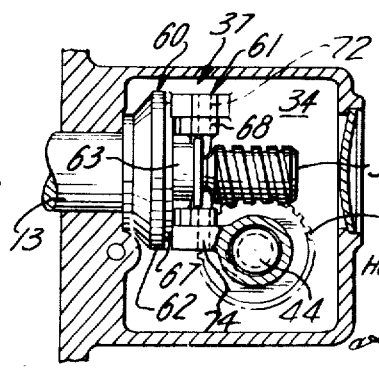
FIG. 3 is a fragmentary cross-sectional view taken along line 3—3 of FIG. 1, showing the r.p.m. sensing unit of this invention.

Now referring to the drawing and, more particularly, to FIGS. 1, 2 and 3, the reference numeral 10 generally designates a liquid metering device combined with a liquid pump assembly 11 in a unitary housing 12. While liquid metering device 10 is shown combined with a pump assembly 11 to constitute an alternative embodiment of the present invention, it should be understood that the liquid metering device constitutes another embodiment separate and apart from pump assembly 11. As will be obvious hereinafter, rotative power for metering device 10 may be obtained from any suitable source. Likewise, the source of pressurized fluid may be from any suitable source other than pump assembly 11. In addition, while the liquid metering device 10 and pump assembly 11 will be described as applied to the metering and pumping of liquid lubricant, it is to be understood that the invention is not limited to such application, but may be employed to meter any pressurized liquid.

LIQUID PUMP ASSEMBLY

The liquid pump assembly 11, as shown in FIGS. 1 and 2, comprises an impeller shaft 13 journaled in housing 12. The shaft 13 is connected to any suitable source of rotary power (not shown), such as the rotor shaft (not shown) of a rotary piston engine (not shown), through a gear 14 or other suitable drive means. Suitably connected to shaft 13 for conjoined rotation therewith, are two gear impellers, 15 and 16. The gear impeller 15 is constructed and arranged to rotate within a gearlike stator 17 and define with the stator a plurality of successively expanding the contracting working or pumping chambers (not shown) to pressurize liquid lubricant. Similarly, gear impeller 16 is constructed and arranged to rotate within a gearlike stator 18 and thereby define with the stator 18 a plurality of successively expanding and contracting working or pumping chambers (not shown) to pressurize liquid lubricant. The gear impeller 15 and its associated stator 17 form part of a pressure pump while gear impeller 16 and its associated stator 18 form part of a scavenging pump. The pressure pump is provided with suitable inlet and outlet connections (not shown) which communicate with the working chambers thereof to receive lubricant from a reservoir of liquid lubricant and force the lubricant to points of lubrication in the engine. The scavenging pump is also provided with suitable inlet and outlet connections (not shown) in communication with the working chambers thereof to draw liquid lubricant from a sump (not shown) of an engine and deliver the same to the lubricant reservoir (not shown). The pressure pump may also be provided with connections (not shown) to supply pressurized liquid to metering device 10 as will be more fully explained hereinafter.

LIQUID METERING DEVICE

As best shown in FIG. 4 and 6, metering device 10 comprises a double-acting piston-cylinder assembly consisting of a metering cylinder 19 journaled for rotation within a bore 20 formed in housing 12 with its longitudinal axis extending substantially normal to the longitudinal axis of pump impeller shaft 13. A double-acting piston or shuttle piston 21 is disposed for limited reciprocative movement within longitudinal bore 22 in cylinder 19. The bore 22 is closed at opposite ends, one end being closed by a plunger 23 of a plunger-cylinder means 23A, hereinafter more fully disclosed. The cylinder 19 is provided with two longitudinally spaced ports 24 and 25 which communicate at one end with the pockets defined in bore 22 and the adjacent opposite ends of shuttle piston 21. The ports 24 and 25 are also circumferentially offset 180° from each other. A pressurized liquid passageway 26 is formed in housing 12 to extend in spaced, substantially parallel relationship with metering cylinder 19. A tapped bore 27 is provided to receive a conduit (not shown) which communicates with a suitable source of pressurized liquid, such as the outlet connection (not shown) of the pressure pump of liquid pump assembly 11. Spaced parallel secondary passageways 28 and 29 are formed in housing 12 to communicate with passageway 26 and to alternately register with ports 24 and 25 as metering cylinder 19 rotates. Two spaced parallel tapped outlet bores, 30 and 31 are also provided in housing 12 to alternately register with ports 24 and 25 as metering cylinder 19 rotates to receive liquid lubricant discharged from the ports. Suitable conduits (not shown) are attached at outlet bores 30 and 31 to receive and conduct the regulated amount of lubricant to a place of use, such as the apex seals of a rotary piston engine.

As best shown in FIGS. 2, 3 and 4, metering cylinder 19 is rotated by a worm 32 which is attached to impeller shaft 13 and a worm wheel 33 which is secured to the metering cylinder in meshing relationship with worm 32. The worm 32 and worm wheel 33 are sized to provide for reduction in angular speed from shaft 13 to cylinder 19. While a speed reduction gearing is shown and described, in other applications of the invention, the cylinder gear drive may provide for no change in r.p.m. or provide an increased r.p.m. over the empeller shaft r.p.m. instead of a reduction of shaft r.p.m., without thereby departing from the scope and spirit of this invention. The worm 32 and worm wheel 33 cylinder drive is disposed in a chamber 34 in housing 11, which chamber is defined by a cavity formed in housing 12 and an overlying end wall 12A of the housing.

In operation of liquid metering device 10 as thus far described, pressurized oil is conducted to passageway 26, via tapped bore 27 and a conduit (not shown) which carries oil from the pressure pump. Simultaneously, metering cylinder 19 is rotated in bore 20 by pump empeller shaft 13, through worm 32 and worm wheel 33, the r.p.m. of metering cylinder 19 being proportional to the r.p.m. of the empeller shaft. The pressurized oil flows from passageway 26 into secondary passageways 28 and 29. When port 25 comes into register with passageway 29, as shown in FIG. 4, oil flows into port 25 and the pockets in bore 22 adjacent to the right-hand end (as viewed in FIGS. 4 and 6 of the drawings) of shuttle piston 21. This pressurized oil forces the shuttle piston to the left (as viewed in FIGS. 4 and 6) to thereby force from the pocket in bore 22 associated with port 24 a portion of the oil trapped therein. The amount of oil discharged into tapped outlet bore 30 is proportionate to the length of the stroke of shuttle piston 21. Conversely, when metering cylinder rotates to bring ports 24 and 25 into register with the secondary passageway 28 and tapped outlet bore 31, respectively, pressurized oil enters the pocket in bore 22 associated with port 24 (adjacent the left-hand end of shuttle piston 21 as viewed in FIGS. 4 and 6) to drive the shuttle piston to the right as viewed in FIGS. 4 and 6. As before, the reciprocative movement of shuttle piston 21, forces oil trapped in the pocket in bore 22 associated with port 25 out of the pocket, through port 25, into tapped outlet bore 31. As previously stated, the amount of oil displaced is proportionate to the length of travel or stroke of shuttle piston 21. From tapped outlet bore 31, the discharged oil forces a like amount of oil to the point of use (not shown), such as the apex seals of a rotary piston engine. To provide for automatically changing the amount of oil discharged by metering cylinder 19 per unit time in relation to the r.p.m. of a rotating mechanism, such as liquid pump assembly 11, a regulating assembly 35 is provided in metering device 10.

REGULATING ASSEMBLY

The regulating assembly comprises three basic subassemblies; which are as follows: the plunger-piston means 23A, a dumping valve 36 and a valve actuating means 37. The three subassemblies coact to vary the length of travel or stroke of shuttle piston 21 in response to a predetermined r.p.m. of a rotating member.

PLUNGER-PISTON MEANS

The plunger-piston means 23A includes, in addition to plunger 23, a piston 38 which is slidably disposed in a recess 39 formed in housing wall 12A coextensive with metering cylinder 19. The piston 38 defines with the bottom of recess 39 a working chamber 40 for receiving pressurized liquid, such as oil. The plunger 23 has a body portion 41 and an integral, reduced diameter shank portion 42 which is slidably receivable in bore 22 of metering cylinder 19. A coil spring 43 is disposed around head portion 41 to bear, at one end, against metering cylinder 19 and, at the opposite end, engage the enlarged head 44 of plunger 23 to thereby bias the plunger to the right as viewed in FIGS. 4 and 6. In this spring biased extreme position, plunger 23 allows shuttle piston 21 to attain maximum travel, and thus maximum discharge of oil. To adjustably limit the maximum movement of plunger 23 under the urging of spring 43, a stop 45 is supported in a threaded stud 46 which is turned in a threaded bore 47 as wall 12A. The desired position of adjustment of stop 45 is fixed by a locknut 48.

DUMPING VALVE

Figure 5:
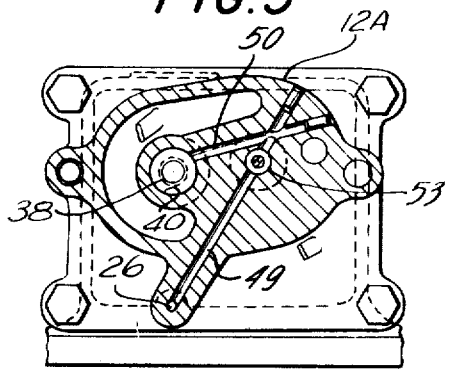
FIG. 5 is a sectional view taken substantially along line 5—5 of FIG. 4.

As best shown schematically in FIG. 7, pressurized oil is conducted to working chamber 40 by a conduit means comprising two intersecting bores 49 and 50 in wall 12A which bores communicate, passageway 26 with working chamber 40. Control of flow of oil through bores 49 and 50 is achieved by dump valve 36. The dump valve 36 comprises a bore 51 in which a spool-type valve body 52 is disposed for reciprocative movement. The valve body has two spaced land portions 53 to define a groove portion 54 therebetween. The bore 51 extends to intersect bore 49 so that when the spool valve body is in the extreme position, as shown in FIGS. 5, 6 and 7, groove portion 54 allows flow through bore 49. Spool valve body 52 is biased in bore 51 to the left, as viewed in FIG. 6, by a spring 55. The tension of spring 55 is adjustable by means of an adjusting screw 56 which is turned in a threaded end portion of bore 51. A locknut 57 is turned upon screw 56 to secure the screw in the desired position of adjustment (see FIG. 6). As shown, one of the land portions 53 of spool valve body 52, upon actuation of the latter, functions to simultaneously interrupt communication of passageway 26 with working chamber 40 while opening a dump passageway 58 which extends from bore 50 to bore 51. To provide for free movement of the spool valve in bore 51 to the right, as viewed in FIG. 6, a vent passageway 51A is provided to prevent liquid entrapment ahead of spool valve body 52 in bore 51. The vent passageway 51A extends from bore 51, through wall 12A, to communicate with cavity 34. To actuate spool valve body 52 against the force of spring 55, spool valve body 52 has a coaxial extension 59 which projects into cavity 34 and into contact with valve actuating means 37.

VALVE ACTUATING MEANS

The valve actuating means 37 comprises, as best shown in FIGS. 2, 3 and 6, an inertia mass means of flyweight ball assembly 60 coacting with a bellcrank mechanism 61.

The flyweight ball assembly 60 comprises a cup-shaped disk 62 mounted on a reduced diameter portion 63 of shaft 13 extending into cavity 34. The disk 62 is secured by a pin 64 to shaft extension 63 so that disk 62 rotates with shaft 13. The disk 62 has a plurality of circumferentially spaced, radially extending, inclined grooves 65 (only two of which are shown in FIG. 2). A ball 66 is disposed in each of the inclined grooves 65, which balls are retained in their associated grooves by a retaining plate 67. The retaining plate is supported on shaft extension 63 for limited slidable, axial movement under the urging of balls 66 as the same ride outwardly in grooves 65. The retaining plate 67 is biased against balls 66 by spring 55 through spool valve body 52 and a bellcrank lever 68. As best shown in FIGS. 6 and 8, bellcrank lever 68 consists of an "L"-shaped body member having a bifurcated portion forming a pair of legs 69 and a single leg portion 70 extending substantially normal to the plane of the legs 69. A portion of the body member adjacent opposite sides of leg portion 70 is rolled to form a pair of hinges 71. The bellcrank lever 68 is pivotally supported on wall 12A by a pivot pin 72 which extends through spaced ears 73 and 74 projecting from wall 12A and hinges 71 of the lever. The bellcrank lever 68 is positioned so that the distal end portions of legs 69 contact retaining plate 67 and leg 70 engages the distal end of extension 59 of spool valve body 52.

OPERATION

As can now be readily seen, as the angular velocity r.p.m. of shaft 13 increases and reaches a predetermined velocity, as determined by the adjustment of spring 55, balls 66 are urged by the centrifugal force acting thereon to ride outwardly in inclined grooves 65. As balls 66 move outwardly in grooves 65, retaining plate 67 is moved along the longitudinal axis of shaft extension 63 to the left as viewed in FIG. 2 and to the right as seen in FIG. 3. The movement of retaining plate 67 pivotally moves bellcrank lever 68, which movement, in turn, forces spool valve body 52 against the tension of spring 55. As can best be seen in FIG. 6, this axial movement of spool valve body 52 in bore 51 unseals dump passageway 58 and simultaneously closes off bore 49 thereby preventing pressurized liquid from passageway 26 reaching chamber 40 and, at the same time, bleeding off pressurized oil from working chamber 40 to cavity 34, via bore 50. Any liquid in bore 51, trapped between spool valve body 52 and screw 56, is released, through vent passageway 51A, so that the liquid does not interfere with the movement of spool valve body 52. The reduction of fluid pressure in chamber 40, permits spring 43 (see FIG. 4) to move plunger 23 to the right as viewed in FIGS. 2 and 6. This movement of plunger 23 allows, as previously described, a greater stroke or travel of piston 21, and thus increased amounts of oil to be discharged through tapped outlets 30 and 31.

When the angular velocity (r.p.m.) of shaft 13 decreases, below the predetermined r.p.m. balls 66 move radially inwardly in inclined grooves 65 as the centrifugal force acting thereon diminishes. The inward movement of balls 66, allows plate 67 to move axially along shaft extension 63 under the urging of the force of spring 55, which force is transmitted from the spring, through spool valve body 52, its extension 59, and bellcrank lever 68, to plate 67. Movement of spool valve body 52 to the left, as viewed in FIG. 6, closes dump passageway 58, while simultaneously restoring communication between bores 49 and 50 and chamber 40. With communication restored between chamber 40 and passageway 26 and the closing of dump passageway 58, main liquid pressure is restored to chamber 40 which overcomes the force of spring 43 (see FIG. 4) to thereby move plunger 23 in a direction to reduce the length of the reciprocative movement of piston 21. The more limited travel of piston 21 results, as previously described, in less oil being discharged through tapped outlets 30 and 31.

It is believed now readily apparent that the present invention provides a novel liquid metering device in which the rate of liquid discharge automatically varies in proportion to a predetermined r.p.m. of a rotating mechanism. It is a liquid metering devices which can be combined with a liquid pump in a compact unitary housing. It is a liquid metering device which is characterized by its simplicity of design, rugged construction, the logical and compact arrangement and assembly of its components parts and units and the extreme facility with which it can be adjusted and repaired.

Although two embodiments of the invention have been illustrated and described in detail, it is to be expressly understood that the invention is not limited thereto. Various changes can be made in the arrangement of parts without departing from the spirit and scope of the invention, as the same will not be understood by those skilled in the art.

What is claimed is:

1. In a liquid metering device having a double-acting piston-cylinder assembly for receiving pressurized liquid and discharging the same alternately from opposite ends of the cylinder of said piston-cylinder assembly upon reciprocative movement of the piston therein and including a piston-cylinder mechanism having a cylinder adjacent the double-acting piston-cylinder assembly with the piston having a portion thereof extending into the cylinder of said double-acting piston-cylinder assembly to limit the extent of the stroke of the piston of said double-acting piston-cylinder assembly, the improvement comprising:
   a. passageway means for conducting pressurized fluid to said piston-cylinder mechanism to urge the piston of the piston-cylinder mechanism in one direction relative to said double-acting piston-cylinder assembly;
   b. means for urging said piston-cylinder mechanism in an opposite direction relative to said double-acting piston-cylinder assembly;
   c. a dump passageway disposed to communicate said passageway means with a point of lower fluid pressure; and
   d. valve means for simultaneously controlling pressurized fluid flow through said passageway means and said dump passageway in response to the angular velocity of a source of rotary power so as to effect reciprocative movement of said piston of the piston-cylinder mechanism and change the length of the stroke of the piston of the double-acting piston-cylinder assembly.

2. The apparatus of claim 1, wherein said means for urging the piston of the piston-cylinder mechanism is a spring which biases the piston toward a position allowing the piston of the double-acting piston-cylinder mechanism the maximum length of stroke.

3. The apparatus of claim 1, wherein said valve means is a spool valve constructed and arranged to reciprocate relative to said passageway means and the dump passageway.

4. In a liquid metering device having a double-acting piston-cylinder assembly for receiving pressurized liquid and discharging the same alternately from opposite ends of the cylinder of said piston-cylinder assembly upon reciprocative movement of the piston therein, the improvement comprising:

a. piston-cylinder mechanism having a cylinder adjacent the double-acting piston-cylinder assembly with the piston having limit means extending into the cylinder of said double-acting piston-cylinder assembly to limit the extent of the reciprocative movement of the piston of the double-acting piston-cylinder assembly;

b. passageway means for communicating the cylinder of said piston-cylinder mechanism with a source of pressurized fluid to force the piston of the piston-cylinder mechanism in one direction relative to said double-acting piston-cylinder assembly;

c. means for moving said piston of the piston-cylinder mechanism in an opposite direction relative to said double-acting piston-cylinder assembly; and d. a dump passageway disposed to communicate the cylinder of said piston-cylinder mechanism with a point of lower fluid pressure than said source of fluid pressure; and e. a spool valve disposed in said passageway means and dump passageway for reciprocable movement in response to the angular velocity of a source of rotary power for simultaneously controlling flow of fluid through the passageway means and to thereby effect reciprocative movement of said piston of the piston-cylinder mechanism and change the length of the stroke of the piston of the double-acting piston-cylinder assembly.

* * * * *

UNITED STATES PATENT OFFICE
CERTIFICATE OF CORRECTION

Patent No. 3,639,082         Dated  February 1, 1972

Inventor(s)   Howard Russell Corwin

It is certified that error appears in the above-identified patent and that said Letters Patent are hereby corrected as shown below:

Column 1, line 50, after the word "supported insert the word
--for--
line 70, the word "resulting" should read
--regulating--

Column 2, line 72, the word "the" should read --and--

Column 4, line 57, the word "as" should read --in--

Column 6, line 24, remove the "s" from the word --devices--
line 35, the word "not" should read --now--
line 52, after the word "said" add --piston of the--.

Signed and sealed this 11th day of July 1972.

(SEAL)
Attest:

EDWARD M.FLETCHER, JR.                ROBERT GOTTSCHALK
Attesting Officer                     Commissioner of Patents